United States Patent [19]

Miller

[11] Patent Number: 4,967,788
[45] Date of Patent: Nov. 6, 1990

[54] WATER FLOW METER RESETTER
[75] Inventor: Louis M. Miller, Dracut, Mass.
[73] Assignee: Watts Regulator Company, Lawrence, Mass.
[21] Appl. No.: 348,783
[22] Filed: May 8, 1989
[51] Int. Cl.$^5$ .............................................. F16L 55/07
[52] U.S. Cl. ...................................... 137/364; 73/201; 285/30
[58] Field of Search ............... 137/364, 368, 369, 370, 137/15; 73/201; 285/30

[56] References Cited
U.S. PATENT DOCUMENTS

| 654,615 | 7/1900 | Estill ...................................... 73/201 |
| 1,281,293 | 10/1918 | Clark . |
| 3,935,736 | 2/1976 | Enright ................................. 73/201 |
| 4,691,727 | 9/1987 | Zorb et al. ........................... 137/15 |

OTHER PUBLICATIONS

Product Literature, "Ford Meter Boxes", The Ford Meter Box Company, Inc (no date).
Product Literature, "The Meter Box Setter", The Ford Meter Company, Inc. (Jun. 1987).
Product Literature, "Water Meter Installation Applications", Watts Regulator Company (no date).
Product Literature, "Catalog No. 46", The Ford Meter Box Company, Inc. (no date).
Product Literature, "Copperline Couplings for Water Meters", Ford Catalog No. 34, Ford Meter Box Co (no date).

Primary Examiner—Stephen M. Hepperle
Attorney, Agent, or Firm—Fish & Richardson

[57] ABSTRACT

A resetter device is for described use in a water supply system having a meter box and, extending therewithin, a system outlet from a water supply system and a system inlet to a water consumer system aligned on a main water supply axis and spaced apart by a predetermined distance selected to receive a water flow meter in connection therebetween. The resetter has a body defining first and second conduits, and first and second horns. The first conduit has a inlet for connection to the system outlet and an outlet connected to the first horn. The first horn defines a flow path from first conduit to a horn outlet. The second conduit has an inlet at which there is connected, via a joint, the second horn which defines a flow path from horn inlet to the second conduit. The horn inlet and outlet are opposed to each other and disposed along a water meter axis spaced from and lying at an acute angle to the main water flow axis. The horn inlet and outlet receive a water flow meter in flow connection therebetween, with the meter disposed along the water meter axis. The second conduit has an outlet for flow connection to the system inlet. A backflow preventer is disposed between the outlet of the second conduit and the system inlet.

8 Claims, 2 Drawing Sheets

WATER FLOW METER RESETTER

The invention relates to devices for resetting water flow devices, e.g. water flow meters.

In an increasing number of localities, it is required that water utilities protect their water supply by preventing reverse flow of water from domestic piping systems back into the main utility pipe lines. The requirement may be met by installation of a backflow preventer device at the water consumer service entrance, typically adjacent the water flow meter. In many circumstances, e.g. in warmer climates where freezing is not a concern and for dwellings without basements, it is necessary to retrofit a backflow preventer to a domestic system having the water flow meter in a meter box disposed in the ground outside a dwelling. These meter boxes are typically sized for snug-fit of a water flow meter therewithin, and the addition of, or, more importantly, the installation of, a backflow preventer (or other flow conditioning device) within the narrow confines of the existing meter box has been a difficult proposition. In the past, this has often meant costly excavation, by heavy equipment, in order to make the necessary modifications to piping. Alternatively, Zorb et al. U.S. Pat. No. 4,691,727 described a resetter device having three, parallel axes. The water flow meter is reset to lie on an axis offset from but parallel to the main water flow axis. A water flow conditioning device, e.g. a backflow preventer, is installed in the main flow axis. In this arrangement, the water flow meter and resetter device piping lie directly above the connector fittings, thus making secure and proper installation a difficult task.

Objectives of the instant invention include providing a resetter device that permits installation of a backflow preventer or other flow conditioning device in line with a water flow meter in a meter box; and positioning the reset water flow meter within the meter box at an angle to the main water flow axis in order to permit access to connector fittings for easier installation and maintenance.

Summary of the Invention

According to the invention, a resetter device is described for use in a water supply system having a meter box and, extending therewithin, a system outlet from a water supply system and a system inlet to a water consumer system, the inlet and outlet aligned in a main water supply axis and spaced apart by a predetermined distance selected to receive a water flow meter in connection between the inlet and outlet on the main water flow axis. The resetter has a body defining a first conduit and a second conduit, and a first horn and a second horn. The first conduit has a inlet adapted for connection to the system outlet and a first conduit outlet at which there is connected the first horn defining a flow path from the first conduit to a horn outlet. The second conduit has an inlet at which there is connected, via a joint, the second horn defining a flow path from a horn inlet to the second conduit. The horn inlet and horn outlet are opposed to each other and disposed along a water meter axis which lies at an acute angle to the main water flow axis. The horn inlet and horn outlet are adapted to receive a water flow meter in flow connection therebetween, with the water flow meter disposed along the water meter axis. The second conduit has an outlet adapted for flow connection to the system inlet. The water flow conditioning device is disposed between the outlet of the second conduit and the system inlet.

In preferred embodiments, the water flow conditioning device is a backflow preventer; the resetter device further comprises the backflow preventer connected at the outlet of the second conduit; the second horn is adapted for pivoting and telescoping movement relative to the body, preferably the joint of the second horn to the body comprises a slip joint double seal connection; and the resetter device further comprises a water flow meter disposed in flow connection between horn inlet and horn outlet.

These and other features and advantages will be seen from the following description of a presently preferred embodiment, and from the claims.

Preferred Embodiment

We first briefly describe the drawings.

Figure 1:
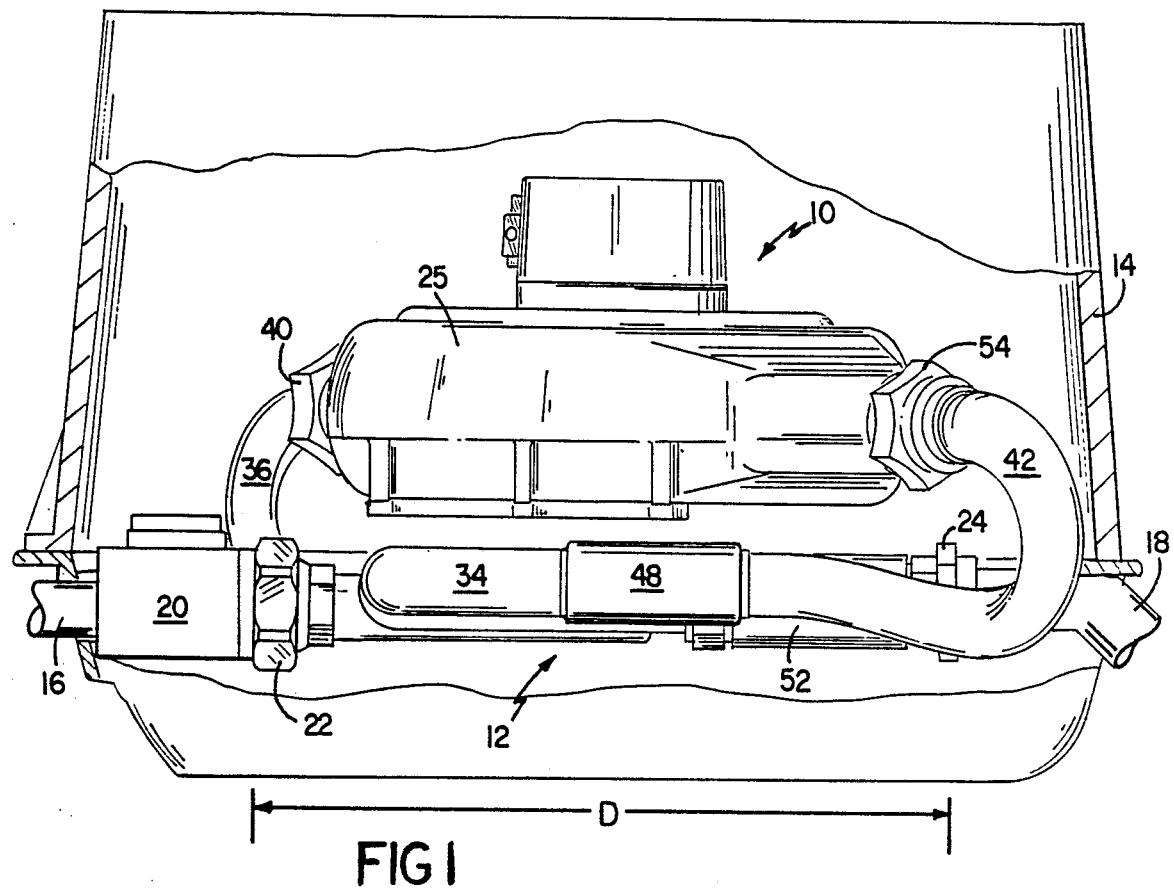
FIG. 1 is a side view of a water flow meter assembly disposed in a meter box, with the meter reset at an acute angle to the main water flow axis by means of a resetter device of the invention.

Referring to FIG. 1, a water flow meter assembly 10 including a resetter device 12 of the invention is disposed within a standard meter box 14, e.g. a Brooks Meter Box #37H. Extending into the meter box on a main water flow axis, A, are opposed water flow inlet piping 16 and water flow outlet piping 18. The inlet piping includes a shut-off valve 20 and terminates in pipe connector fitting 22. The distance, D, between fitting 22 and threaded outlet 24 of outlet piping 18 is predetermined for installation of a water meter 25 therebetween, e.g. a Neptune Meter Model T-10.

Figure 2:
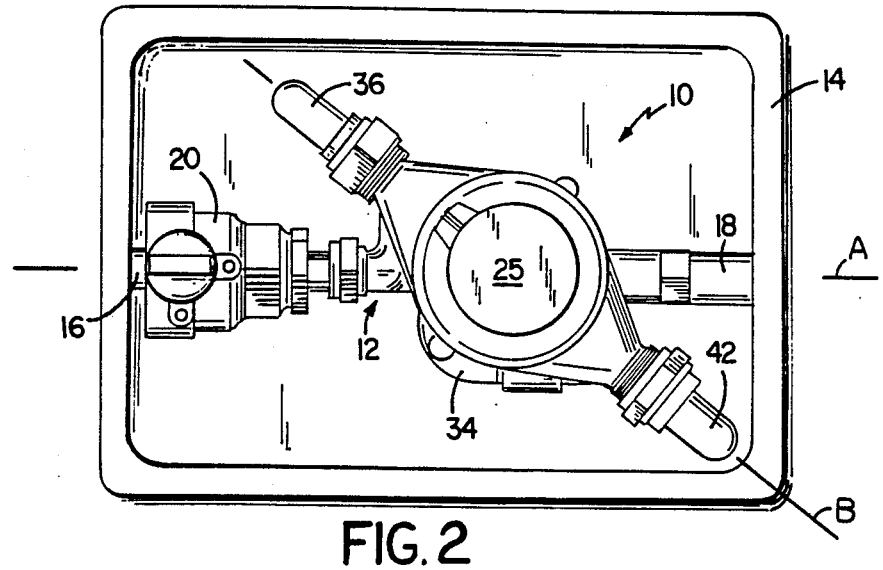
FIG. 2 is a plan view of the water flow meter assembly of FIG. 1.
Figure 3:
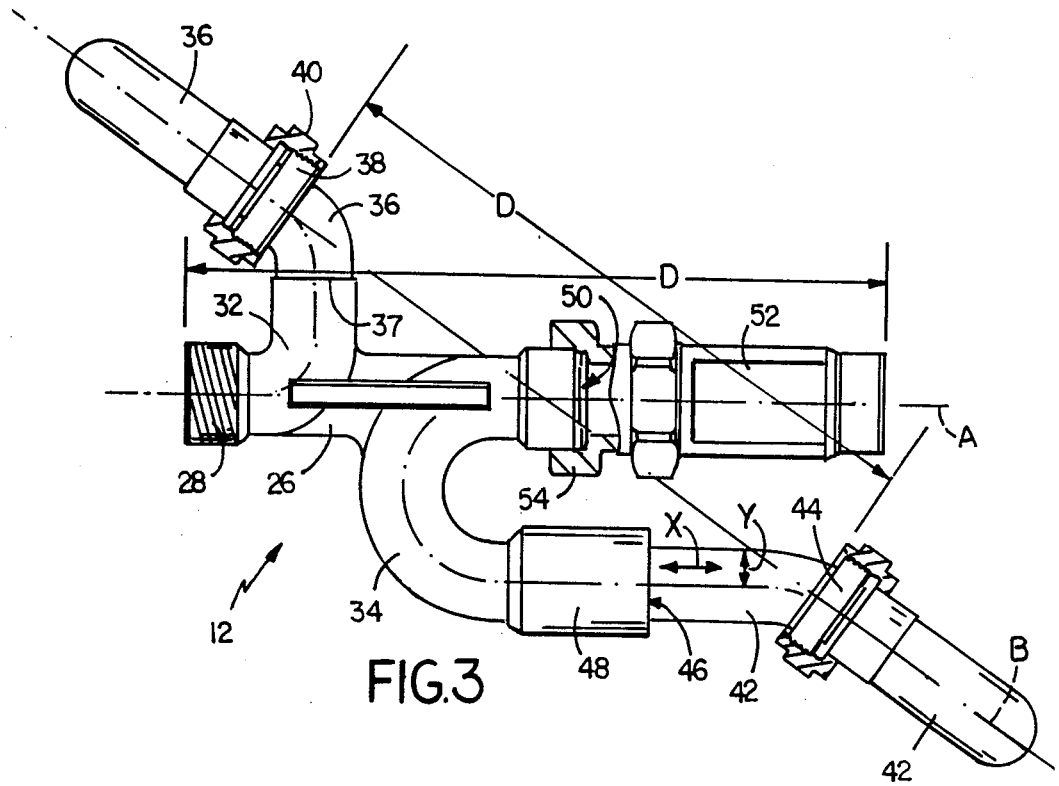
FIGS. 3 and 4 are top and side views, respectively, of the resetter device of the invention.
Figure 4:
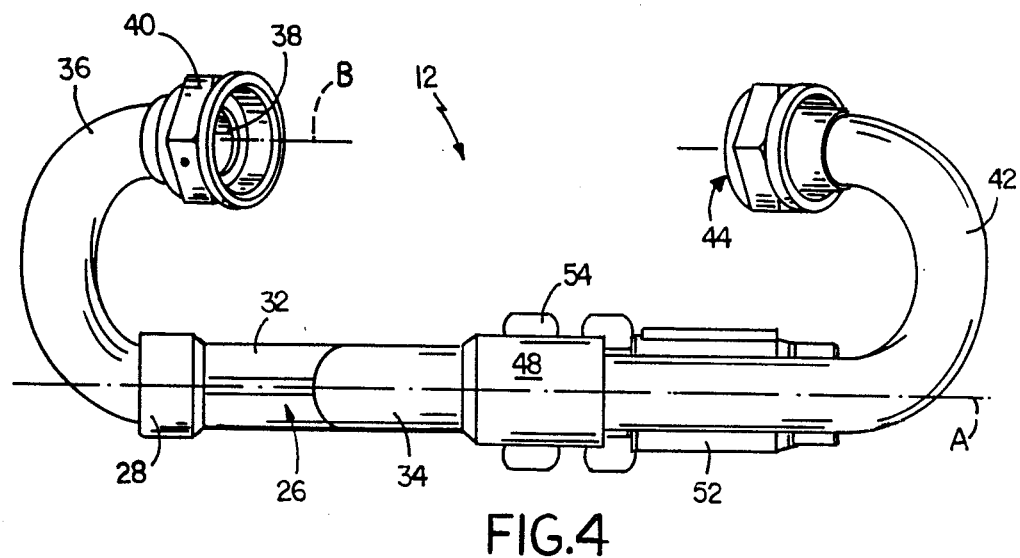

According to the invention, in order to install, within the existing meter box 14, a backflow preventer in the water supply line between the main utility pipeline and a customer domestic water system, the water flow meter is removed, and a resetter device 12 of the invention installed immediately in its place. Referring now also to FIGS. 2, 3 and 4, the dimension of the resetter device (including backflow preventer) along the main flow axis, A, is also, D, corresponding to the dimension of the water meter.

The resetter device 12 consists of a diverter body 26, e.g. of cast bronze, having an externally threaded inlet 28 sized for engagement with the fitting 22 of the utility water flow outlet. The diverter body defines first and second conduits 32, 34, respectively. First Conduit 32 directs water flow from utility outlet 16 through the diverter body to horn 36, e.g. 1-inch diameter tubing of type k copper secured to the diverter body at a lead free solder joint 37 tested to 250 psi. Horn 36 defines a water flow conduit and extends upwardly to terminate at outlet 38 about which is disposed threaded pipe fitting 40. A second horn 42 has an inlet 44 opposed to outlet 38 of first horn 36, inlet/outlet 44/38 lying on axis B, spaced from and disposed at an acute angle to main water flow axis A. Horn 42, also formed of 1-inch diameter tubing of type k copper, is secured at joint 48 to inlet 46 of the diverter body second conduit 34. Joint 48 is preferably an integral slip joint double seal connection which provides telescoping and pivoting capabilities (arrows x, y) of horn 42 relative to diverter body 26 in order to permit and assure alignment of the assembly.

The second conduit 34 of diverter body 26 directs flow from joint 48 to diverter body outlet 50 at which there is disposed, in threaded engagement, a backflow preventer 52, e.g. a Watts Dual Check Series 7, as sold by Watts Regulator Company of North Andover, Massachusetts. The backflow preventer 52 in turn is connected to the inlet 24 of the piping 18 to the domestic system.

In this manner, there is provided an improved water flow meter assembly with backflow preventer installed within the confines of an existing (or newly installed) meter box. According to the invention, the resetter device inlet and outlet and the backflow preventer are disposed along the main flow axis A in the space occupied by the water flow meter in prior art constructions. The water flow meter is disposed thereabove, on water meter axis, B, at an acute angle to the main meter flow axis, A. As a result (best seen in FIG. 2). the water meter assembly arrangement of the invention allows easy access to the water shutoff valve 20, to the pipe fittings 22, 54 and to the backflow preventer 52 in order to permit installation and/or replacement of the water flow meter or other components from within the meter box.

Other embodiments are within the following claims.

What is claimed is:

1. For use in a water supply system comprising a meter box and, extending therewithin, a system outlet form a water supply system and a system inlet to a water consumer system, said inlet and said outlet aligned on a main water supply axis and spaced apart by a predetermined distance selected to receive a water flow meter in connection between said inlet and said outlet on said main water flow axis, a resetter, said resetter comprising a body defining a first conduit and a second conduit, and a first horn and a second horn, said first conduit having a inlet adapted for connection to said system outlet and a first conduit outlet at which there is connected said first horn, said first horn defining a flow path from said first conduit to a horn outlet, said second conduit having a second conduit inlet at which there is connected, via a joint, said second horn, said second horn defining a flow path from a horn inlet to said second conduit, said first conduit outlet disposed generally about a first axis and said second conduit inlet disposed generally about a second axis that is generally perpendicular to said first axis, said horn inlet and said horn outlet opposed to each other and disposed along a water meter axis, said water meter axis spaced from and lying at an acute angle to said main water flow axis, said horn inlet and said horn outlet adapted to receive a water flow meter in flow connection therebetween, with the water flow meter disposed along said water meter axis, said second conduit having an outlet adapted for flow connection to said system inlet, and a water flow conditioning device disposed between the outlet of said second conduit and said system inlet.

2. The resetter device of claim 1 wherein said flow conditioning device comprises a backflow preventer.

3. The resetter device of claim 2 wherein said resetter device further comprises said backflow preventer.

4. The resetter device of claim 1 wherein said second horn is adapted for pivoting and telescoping movement relative to said body.

5. The resetter device of claim 3 wherein said joint of said second horn to said body comprises a slip joint double seal connection.

6. The resetter device of claim 1 further comprising a water flow meter disposed in flow connection between said horn inlet and horn outlet.

7. The resetter of claim 1 for use in a water meter system having a meter box of quadrilateral cross section, wherein said main water axis is disposed generally normal to a wall of the meter box, and said meter axis is disposed generally transverse the walls of the meter box.

8. The resetter of claim 7 wherein said meter axis is disposed generally a diagonal of said meter box.

* * * * *